UNITED STATES PATENT OFFICE.

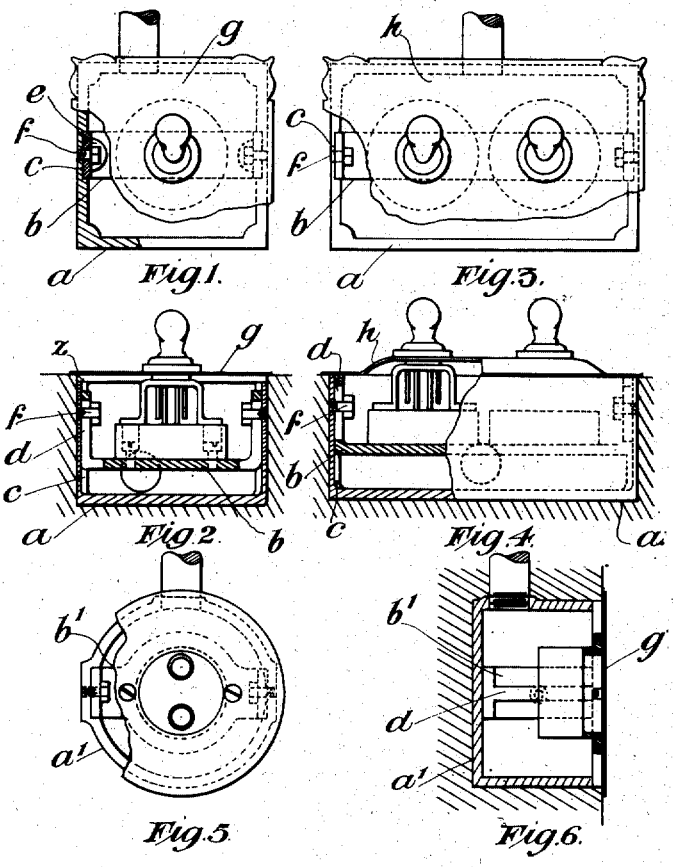

ARTHUR WILLIAM SCLATER, OF PICCADILLY, WESTMINSTER, ENGLAND.

ELECTRIC CONTACT-BOX.

1,227,837.      Specification of Letters Patent.      Patented May 29, 1917.

Application filed October 26, 1914. Serial No. 868,695.

*To all whom it may concern:*

Be it known that I, ARTHUR WILLIAM SCLATER, a subject of the King of England, and residing at Piccadilly, in the city of Westminster and the Kingdom of England, have invented certain new and useful Improvements in Electric Contact-Boxes, of which the following is a specification.

In domestic electric wiring buried in walls and behind paneling, tiling and other wall coverings a difficulty arises as to the correct depth to set the iron or metal switch boxes in the walls so that when the plastering or other wall surface is finished the switch fixed in its protecting iron box shall be at correct depth. The greatest care can be taken in fixing the switch box correctly, but any slight variation in the thickness of the plaster or other wall surface throws out the projection of the switch handle or knob above the finished wall.

It has been proposed to mount switches and other apparatus in wall boxes upon adjustable carriers, distance pieces and the like for the purpose of adjusting the height of the apparatus in the box.

According to my invention I provide an adjustable bridge piece hereinafter called the bridge in the form of three sides of an oblong consisting of a strip of metal, fiber, vulcanite or other suitable material which can be cast, hammered, stamped, pressed or molded according to the material of which it is composed and in the two parallel sides long slots are cut or formed through which pass bolts or screws fixed to the sides of the box and which enable the position of the bridge in the box to be adjusted and held in position so that the switch handle or knob can be made to project beyond the surface of the wall more or less as required.

I sometimes arrange the bridge to fit into recesses cast in the sides of the switch box by which means it is kept steady and the bridge can be moved in and out of the box as required.

The slots can be of the well known keyhole type so that the head of the bolt or screw can pass through an enlargement of the slot thereby enabling the bridge with the switch attached to be removed from the box by simply loosening the bolts or screws or the slots can be cut out to the free end of the parallel sides.

The boxes can be arranged to carry single switches or any larger number and in some cases it is convenient to fix two or more switches to the same bridge.

As the bridge is arranged above the bottom or back of the box ample room is provided to allow the wiring to pass behind below or under the switch without any obstruction.

Owing to the way in which the switches can be adjusted inside the box it will be observed that the covering plate can be of plain domed or recessed type as the bridge carrying the switches can be raised or lowered in the box as required to accommodate the cover plate.

In addition to boxes for switches this invention is applicable to bell pushes, wall sockets, fuse blocks and other electrical apparatus used in the wiring of buildings.

To enable the invention to be fully understood I will describe it by reference to the accompanying drawings.

Figure 1 is a front elevation partly in section of a single switch box made in accordance with this invention with part of the covering plate broken away.

Fig. 2 is a horizontal section of the same switch box.

Fig. 3 is a front elevation of a double switch box.

Fig. 4 is a horizontal plan partly in section of the same switch box.

Fig. 5 is a front elevation of a wall socket box with part of the covering plate broken away.

Fig. 6 is a vertical section of the same wall socket box.

In Figs. 1, 2, 3, and 4 $a$ is the iron or metal switch box which is let into the wall, care being taken that the front does not project beyond the finished surface of the wall, but which may be below the finished surface as indicated at $z$ in Fig. 2.

$b$ is the bridge which carries the switch or switches, wall socket, bell push, fuse block or other electrical apparatus. It will be observed that this bridge spans the box from side to side and that a clear space is provided behind it to provide a passage for wires without obstruction.

$c$ shows the recesses into which the bridge $b$ slides and by which it is kept steady in the box.

The slots in the bridge are indicated by *d* in the sections Figs. 2 and 4 and in elevation in Fig. 6.

In Fig. 1 the keyhole type of slot is indicated by the letter *e* which shows the keyhole as a semicircle. It will be observed that by loosening the bolts or screws *f* it is possible to draw out the bridge from the box with the switch attached, the heads of the bolts or screws *f* passing through the enlarged keyhole end *e* of the slot *d*.

It will be observed that in Fig. 2 the switch box is sunk below the finished surface of the wall indicated at *z* and that a flat covering plate *g* is used.

In Fig. 4 the front of the box is let in flush with the finished surface of the wall and a domed covering plate *h* is used.

The adjustment obtained by moving the bridges in or out is observable in these two figures.

Figs. 5 and 6 show a circular box *a'* in which is mounted a wall socket and in which the bridge *b'* is placed in the box in inverted manner to that shown in Figs. 1, 2, 3 and 4, which is sometimes more convenient for mounting such pieces of apparatus as wall sockets and bell pushes.

I claim:

1. The combination with a contact box having an opening in its front face, of a U-shaped bridge carried therein having slots in the parallel members thereon, and means for clamping said parallel members to the walls of the contact box in fixed adjusted positions.

2. The combination with an electric contact box having an opening in its front face and grooves in its opposite walls, of a substantially U-shaped bridge adjustably carried in said grooves offset from the bottom of the box, the parallel members of the bridge being slidably carried in said grooves, and means for clamping the parallel members of the bridge in fixed positions on the walls of said box in said grooves, substantially as described.

3. The combination with an electric contact box having an opening in its front face, of a substantially U-shaped bridge removably carried therein offset from the bottom of the box, having elongated slots in the parallel members thereof and enlarged extensions thereof in the adjacent ends of the connecting member, and screws passing through said slots for removably and adjustably securing the bridge in fixed position, substantially as described.

4. The combination with an electric contact box having an opening in its front face, of a substantially U-shaped bridge removably carried therein offset from the bottom of the box, having slots in the parallel members thereof, and screws passing through said slots and engaging the adjacent walls of the box for removably and adjustably clamping the bridge in fixed position on said walls.

In testimony that I claim the foregoing as my invention, I have signed my name before the subscribing witnesses this 15th day of October, 1914.

ARTHUR WILLIAM SCLATER.

Witnesses:
ELIE JOSEPH LACOMBE-LANE,
MARGARET FRANCES BIGGS.